United States Patent
Evans

[15] 3,662,864
[45] May 16, 1972

[54] DISK TYPE BRAKE WITH SPLIT PRIMARY SHOE

[72] Inventor: Anthony C. Evans, Westland, Mich.
[73] Assignee: Kelsey-Hayes Company
[22] Filed: Nov. 5, 1969
[21] Appl. No.: 874,349

[52] U.S. Cl. ........................................ 188/72.2, 188/72.7
[51] Int. Cl. ........................................ F16d 55/46
[58] Field of Search ........................................ 188/72.2, 72.7

[56] References Cited

UNITED STATES PATENTS

| | | | |
|---|---|---|---|
| 3,335,820 | 8/1967 | Burnett | 188/72.7 |
| 3,410,372 | 11/1968 | Hodkinson et al. | 188/72.6 X |
| 3,422,934 | 1/1969 | Hambling | 188/72.2 |
| 3,425,519 | 2/1969 | Frigger | 188/72.7 X |

FOREIGN PATENTS OR APPLICATIONS

| | | | |
|---|---|---|---|
| 960,036 | 6/1964 | Great Britain | 188/72.2 |
| 1,034,172 | 6/1966 | Great Britain | 188/72.2 |

*Primary Examiner*—George E. A. Halvosa
*Attorney*—Harness, Dickey & Pierce

[57] ABSTRACT

A disk type parking brake embodying a split primary shoe with a wedge-like actuator. The wedge-like actuator holds the split primary shoes against inclined surfaces of the caliper for effecting a self servo action upon the shoes. A lever type actuating mechanism is incorporated and pivotal movement of an actuating lever accomplishes an automatic adjustment of the mechanism to compensate for wear.

9 Claims, 7 Drawing Figures

INVENTOR.
Anthony C. Evans
BY
Harness, Dickey & Pierce
ATTORNEYS

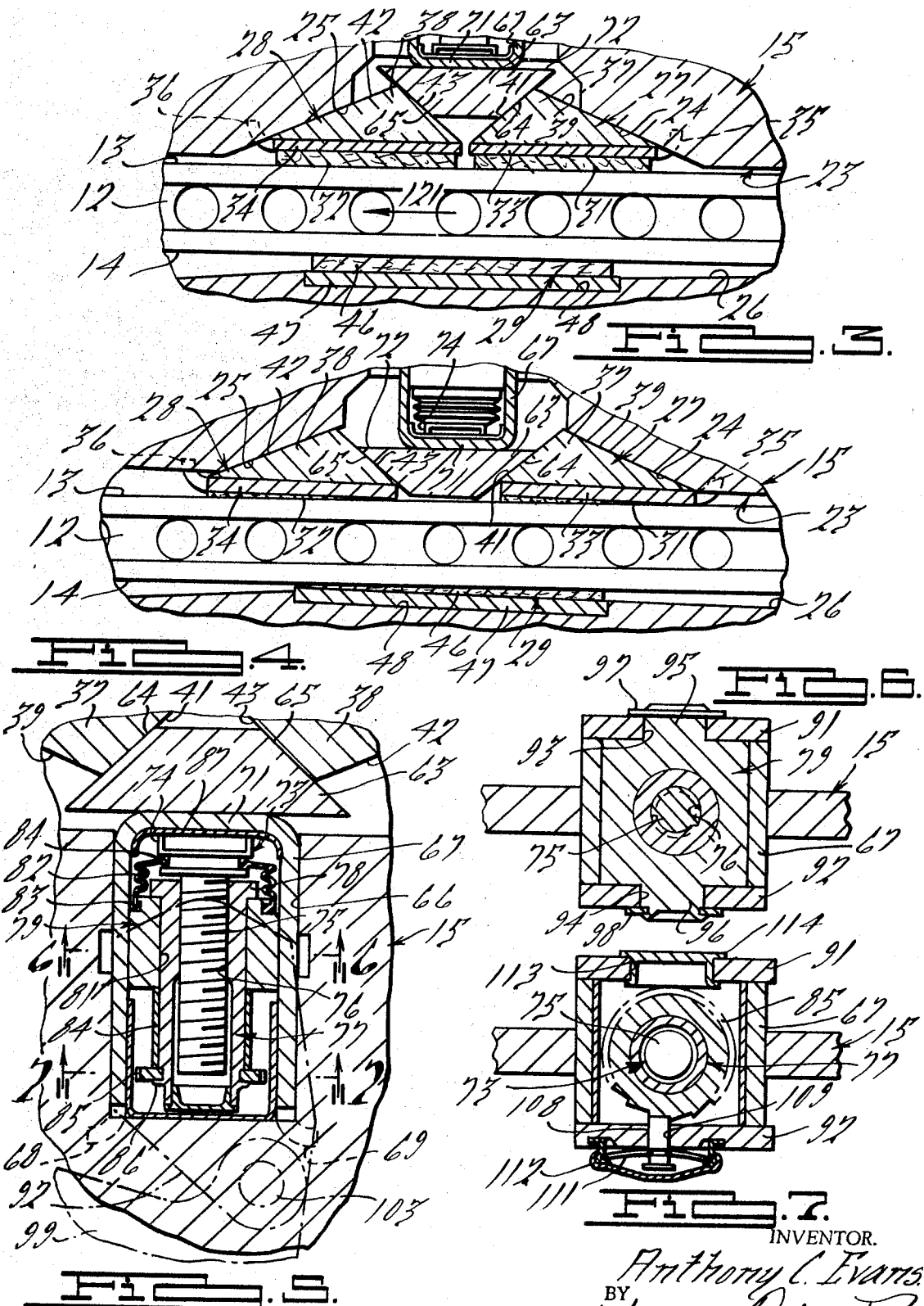

3,662,864

DISK TYPE BRAKE WITH SPLIT PRIMARY SHOE

BACKGROUND OF THE INVENTION

This invention relates to a disk type brake with a split primary shoe and to an improved automatic adjusting mechanism for this type of brake.

Various types of mechanisms have been proposed for imparting some self-energization or servo action upon the brake shoes. Such self-energization is particularly desirable in a disk type parking brake since disk brakes do not have any significant inherent action of this type. Generally, the self-energization may be accomplished by providing an inclined surface between the brake pad and the member against which it reacts. The inclination of the surface is such that a force component is generated upon the brake pad in an axial direction and toward the associated braking surface of the disk. With such inclined surfaces, wear of the frictional lining normally increases the amount of travel the brake pad must go through before the surfaces come into engagement. Various schemes have been proposed for maintaining these surfaces in contact throughout the lining life, but these arrangements have been, for the most part, expensive.

It is, therefore, a principal object of this invention to provide an improved, simplified disk type parking brake with a self servo action.

It is another object of this invention to provide an improved disk type parking brake with a self servo action.

It is a further object of this invention to provide a disk type brake with a split primary shoe.

It is yet a further object of this invention to provide a split shoe disk brake having an improved and simplified actuating mechanism.

Various devices have been proposed for mechanically actuating disk type brakes. Such mechanical actuators are normally used for parking brakes. With a mechanical actuator, it is desirable to incorporate an automatic adjusting mechanism for compensating for lining wear.

It is, therefore, another object of this invention to provide an improved automatic adjuster for a disk type brake.

SUMMARY OF THE INVENTION

A first feature of this invention is particularly adapted to be embodied in a disk brake assembly. Such a brake assembly includes a pair of spaced brake pads each adapted to be positioned adjacent a braking surface of an associated brake disk. A supporting member is affixed against rotation relative to the disk and the supporting member and brake pads have cooperating surfaces that are inclined with respect to the disk braking surface. An actuating member is supported for movement in a direction generally perpendicular to the disk braking surface. Cooperating surfaces are formed on the actuating member and on the brake pads for moving the brake pads into frictional engagement with the disk braking surface and for moving the cooperating inclined surfaces of the brake pads and supporting member into engagement upon movement of the actuating member.

Another feature of the invention is adapted to be embodied in an automatic adjusting mechanism for a brake or the like. Such a mechanism includes a first member supported for sliding movement, a second member adapted to actuate the brake or the like and means forming a screw and nut connection between the first and second members. The screw and nut connection is adapted to lengthen the distance between the members upon relative rotation of the screw and nut connection. A lever is pivotally connected to the first member and actuating means are provided for moving the lever and for sliding the first member. Adjusting means accomplish an incremental relative rotation of the screw and nut connection upon pivotal movement of the lever to effect automatic adjustment when the lever is operated.

BRIEF DESCRIPTION OF THE DRAWINGS

FIG. 3 is an enlarged cross-sectional view taken along the line 3—3 of FIG. 2.

FIG. 4 is a view, in part similar to FIG. 3, showing the mechanism as it appears after the brake linings have been significantly worn.

FIG. 5 is an enlarged cross-sectional view taken along the line 5—5 of FIG. 2.

FIG. 6 is a cross-sectional view taken along the line 6—6 of FIG. 5.

FIG. 7 is a cross-sectional view taken along the line 7—7 of FIG. 5.

DETAILED DESCRIPTION OF THE PREFERRED EMBODIMENT

Figure 1:
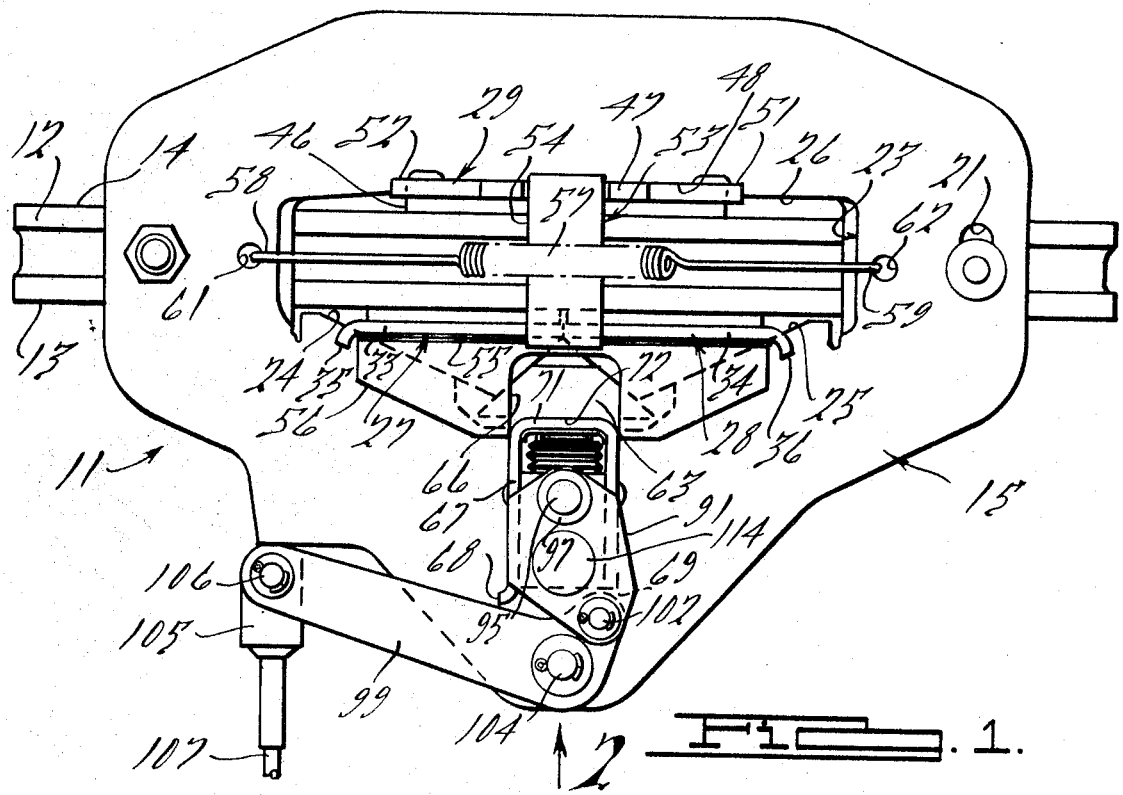
FIG. 1 is a top plan view of a disk brake embodying this invention.
Figure 2:
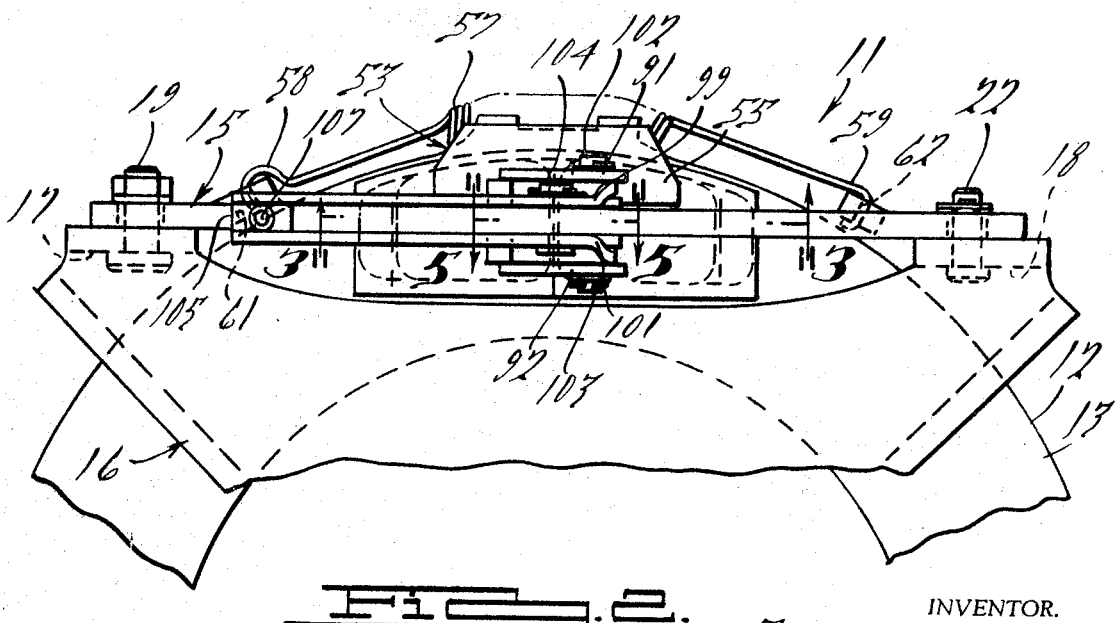
FIG. 2 is a side elevational view of the brake taken in the direction of the arrow 2 in FIG. 1.

The reference numeral 11 indicates generally a disk type brake embodying this invention. The brake 11 is particularly adapted for automotive application and may be considered as being the vehicular parking brake. The brake 11 coacts with a disk 12 having oppositely facing, annular braking surfaces 13 and 14. The disk 12 is affixed for rotation with a vehicular wheel (not shown) and may be acted upon by any known service brake (not shown).

The brake assembly 11 includes a generally planar caliper, indicated generally by the reference numeral 15. The caliper 15 is juxtaposed to a supporting member, indicated generally by the reference numeral 16. The supporting member 16 is fixed against rotation relative to the disk 12 and has a pair of outstanding flanges 17 and 18 that overlie the outer periphery of the disk 12. The caliper 15 is pivotally supported upon the flange 17 by means of a pivot pin assembly 19. Adjacent the flange 18, the caliper 15 is formed with an elongated slot 21 that passes a pin assembly 22 so as to hold the caliper 15 against radial movement with respect to the supporting member 16. The caliper 15 is, however, free to pivot with respect to the supporting member 16 about the pivot pin 19. The slot 21 is shaped so as to permit this movement.

The caliper 15 is formed with a central opening or throat, indicated generally by the reference numeral 23, through which a portion of the disk 12 extends. The opening 23 is formed by a pair of outwardly converging inclined edges 24 and 25 that are disposed on the side of the disk 12 adjacent the braking surface 13. On the opposite side of the disk 12 and adjacent the braking surface 14, the opening 23 is defined by a generally planar edge portion 26. A pair of primary brake pads, indicated generally by the reference numerals 27 and 28, are juxtaposed to the disk braking surface 13 adjacent the caliper surfaces 24 and 25. In a like manner, a secondary brake pad, indicated generally by the reference numeral 29, is juxtaposed to the disk braking surface 14 and to the caliper edge portion 26.

The brake pads 27 and 28 are comprised of frictional linings 31 and 32 and associated backing plates 33 and 34, respectively. The backing plates 33 and 34 each have rearwardly bent tangs 35 and 36, respectively, that overlie the caliper 15 to support the brake pads 27 and 28 in a radial direction with respect to the caliper 15 and disk 12. Generally triangular shaped backing pieces 37 and 38 are affixed to each of the pad backing plates 33 and 34. The piece 37 has an inclined surface 39 that abuttingly engages with the caliper edge 24 and which is disposed at substantially the same angle to this edge. The surface 39 is intersected by a second surface 41 that converges toward the surface 39 in an axial direction moving away from the braking surface 13 of the disk. In a like manner, the backing piece 38 has converging surfaces 42 and 43. The surface 42 is abuttingly engaged with and disposed at the same angle as the caliper edge 25. It will be noted that the edges 24 and 25 and surfaces 39 and 42 converge in an axial direction moving away from the disk braking surface 13.

The brake pad 29 is comprised of a frictional lining 46 and a backing plate 47. The backing plate 47 is received in a notched cut-out 48 formed in the caliper 15 centrally of its edge 26. The brake pad 29 is thus held against circumferential movement relative to the caliper 15. The backing plate 47 is formed with a pair of outstanding tangs 51 and 52 that overlie the upper surface of the caliper 15 so as to provide radial support for the brake pad 29.

A holddown member, indicated generally by the reference numeral 53, is provided for holding the brake pads 27, 28 and 29 against radial outer movement with respect to the caliper 15. The holddown member 53 has a strap-like portion 54 that extends across the outer periphery of the disk 12 and which engages the upper edge of the backing plate 47 of the pad 29. At its other end, the strap-like portion 54 terminates in a radially extending section 55 that engages the outer edge of the backing plates 33 and 34 of the brake pads 27 and 28. From this portion, the holddown member 53 has a portion 56 that lies over the radial outer surface of the caliper 15 and which engages the radial outer side of the backing pieces 37 and 38. The holddown member 53 is held in position by means of a spring 57 that extends generally in the same direction as the disk 12 and which overlies the outer periphery of the disk 12. The holddown spring 57 has end portions 58 and 59 that are received in apertures 61 and 62 formed in the caliper 15.

A piece having a shape complementary to the portion 56 of the holddown member 53 may be affixed to the radial inner side of the caliper 15 to underlie the backing pieces 37 and 38 and provide further support for the pads 27 and 28. This piece does not appear in the drawings.

In order to actuate the brake assembly 11, an actuating wedge, indicated generally by the reference numeral 63, is provided. The actuating wedge 63 has a pair of inclined surfaces 64 and 65 that converge toward the disk braking surface 13 (FIGS. 3 and 4). The wedge 63 is held radially in place by the holddown piece portion 56 and the aforedescribed piece that is positioned on the radial inner side of the caliper 15. The surfaces 64 and 65 are disposed at the same angle and are in abutting relationship with the backing piece surfaces 41 and 43. A generally axially extending slot 66 is formed in the caliper 15 adjacent to the disk braking surface 13. A U-shaped actuating member 67 is received in the slot 66 and has a pair of outturned flanges 68 and 69 at its outer extremity that slidably engage the radial outer side of the caliper 15. The cross leg 71 of the U-shaped actuating member 67 abuttingly engages a rear surface 72 of the actuating wedge 63.

Received within the actuating member 67 and abuttingly engaged with the rear surface of the cross leg 71 is a male threaded member, indicated generally by the reference numeral 73. The male threaded member 73 has a head portion 74 in engagement with the cross leg 71 and a threaded shank 75. The threaded shank 75 is threadingly received in female threads 76 of a sleeve, indicated generally by the reference numeral 77. The sleeve 77 has an enlarged portion 78 at one end that is abuttingly engaged with a block-like member, indicated generally by the reference numeral 79. The member 79 is formed with a bore 81 through which the sleeve 77 extends. A flexible, boot-like seal 82 is received in a groove 83 in the member 79 and a circumferential groove 84 formed in the screw head 74.

A bushing 84 encircles the end of the sleeve 77 that is exposed at the rear of the block-like member 79 and is held in place by a serrated wheel 85 that is, in turn, affixed to the sleeve 77 by an upset portion 86 of the latter. Hence, the bushing 84 coacts with the headed portion 78 of the sleeve 77 to axially affix the sleeve with respect to the block-like member 79. The sleeve 77 may, however, rotate with respect to the block 79. The screw 73 is held against rotation, however, by means of a generally channel shaped piece 87 that is affixed to its headed portion 74 in any known manner and which is received in a complementary recess in the actuating member 67. Hence, rotation of the sleeve 77 with respect to the screw 73 will cause the actuating member 67 to move in an axial direction relative to the block-like member 79.

Upper and lower operating levers 91 and 92 have bores 93 and 94 that receive integral pivot pin portions 95 and 96 of the block-like member 79 (FIG. 6). Snap rings 97 and 98 are received in respective pivot grooves on the pivot pin portions 95 and 96 to hold the levers 91 and 92 to the block-like member 79. The levers 91 and 92 are, however, free to pivot about the pivot pin portions 95 and 96. The opposite ends of the levers 91 and 92 are pivotally connected to a pair of actuating levers 99 and 101 by means of pivot pins 102 and 103. The actuating levers 99 and 101 are, in turn, pivotally supported upon the caliper 15 by a common pivot pin 104. The outer end of the actuating levers 99 and 101 are pivotally connected to a trunnion 105 by means of pivot pin 106. The trunnion 105 is, in turn, connected to a flexible actuator 107 for exerting a rotational force upon the actuating levers 99 and 101. The other end of the flexible transmitter 107 is adapted to be actuated in any known manner by the vehicle operator.

A detent pin 108 is slidably supported in a bore 109 in the actuating lever 92 (FIG. 7) adjacent to the serrated wheel 85. The detent pin 108 is normally biased toward the serrated wheel 85 by means of a spring 111 that is held within a cage 112 carried by the actuating lever 92. On the diametrically opposite side of the serrated wheel 85, the actuating lever 91 is formed with an access opening 113 that is closed by a resilient plug 114.

OPERATION

In order to actuate the brake assembly 11, a tensile force is exerted upon the wire actuator 107 in any known manner. This causes the operating levers 99 and 101 to rotate in a counterclockwise direction about the pivot pin 104 as viewed in FIG. 1. It will be noted from an inspection of FIG. 1 that the pivot pins 102 and 103 are in an overcentered relationship when the brakes are released and the counterclockwise rotation of the actuating levers 99 and 101 will cause the actuating links 91 and 92 to pivot and exert an axial force on the block-like member 79 through its pin portions 95 and 96. The force exerted on the member 79 will be transmitted through the sleeve 77 to the screw 73 and thence through the actuating member 67 to the actuating wedge 63. The inclined surfaces 64 and 65 of the wedge 63 act on the corresponding surfaces 41 and 43 of the brake pads 27 and 28. The force thus transmitted has two components one of which acts axially upon the brake pads 27 and 28 to move them into frictional engagement with the disk braking surface 13 and one which tends to cause them to separate and bring their surfaces 39 and 42 into tight abutting relationship with the caliper edges 24 and 25. In addition to forcing the brake pads 27 and 28 into frictional engagement with the disk braking surface 13, the aforenoted actuating movement will cause a reactive force on the caliper 15 through the pivot pin 104. This reactive force will cause the caliper 15 to pivot in a clockwise direction about the pivot pin 19 as viewed in FIG. 1. This pivotal movement is transmitted from the caliper edge 26 to exert a force on the brake pad 29 causing it to move into frictional engagement with the disk braking surface 14.

A self-energization force is also provided by the described brake. This force results due to the inclined surfaces of the backing pieces 37 and 38 and may best be understood by reference to FIG. 3. Assuming that the disk 12 tends to rotate in the direction of the arrow 121, the brake pad 28 will also tend to rotate in this direction. This rotation is resisted by a force that is exerted from the caliper 15 through its edge 25 against the backing piece edge 42 of the brake pad 28. This force may be resolved into two components, one of which opposes a force in the direction of the arrow 121 and the other of which acts perpendicularly to the direction of rotation. This perpendicular component adds to the actuating effect and thus achieves self-energization. It should be readily apparent that if the disk 12 tends to rotate in a direction opposite to that of the arrow 121, a self-energization will be generated on the brake pad 27 in the same manner as described.

When the actuating levers 91 and 92 rotate to actuate the brake assembly 11, the pin 108 will move to the left as viewed in FIG. 7. At this time, it will enter into a new serration of the serrated wheel 85 under the force of the spring 111. Upon release of the brake, the levers 99 and 101 will rotate in an opposite direction under the influence of the force of a return spring (not shown). This return spring force will move the serrated wheel 85 incrementally and will rotate the sleeve 77 relative to the screw 73. The threads 75 and 76 are of such a hand that this relative rotation causes elongation of the distance between the actuating member 67 and the block-like member 79. Hence, the actuating member 67 will be moved into closer proximity to the disk braking surface 13 thus compensating for wear of the linings 31 and 32. The caliper 15 will also be pivoted slightly during this motion and compensate for wear of the lining 46 of the brake pad 29. If it is desired to provide a manual adjustment, the plug 114 may be removed and the serrated wheel 85 can be rotated through the opening 113 by means of any suitable tool.

In addition to providing for automatic wear adjustment, the described brake assembly and particularly the shape of the actuating wedge 63 will hold the surfaces 39 and 42 of the backing pieces 37 and 38 in engagement with the caliper edges 24 and 25 after the linings 31, 32 and 46 have been worn as may be readily seen from an inspection of FIG. 4. Thus, on each successive brake application, no slack need by taken up between the inclined surfaces that provide the self-energization.

What is claimed is:

1. A disk brake assembly comprising a pair of spaced brake pads each adapted to be positioned adjacent a braking surface of an associated brake disk, a supporting member fixed against rotation relative to the disk, said supporting member and said brake pads having cooperating surfaces inclined with respect to the braking surface of the associated brake disk, said surface on said brake pads being adapted to move away from the cooperating surfaces on said supporting member when said brake pads move axially into engagement with the associated brake disk braking surface, a single wedge shaped actuating member supported for movement in a direction generally perpendicular to the disk braking surface, and cooperating surfaces on said wedge shaped actuating member and on said brake pads, said cooperating surfaces on said wedge shaped actuating member and on said brake pad having a component for moving said brake pads axially and a component for moving said brake pads toward said supporting member for moving said brake pads into frictional engagement with the disk braking surface and for moving said cooperating inclined surfaces of said brake pads and said supporting member into engagement upon movement of said actuating member.

2. A disk brake assembly as set forth in claim 1 wherein the cooperating inclined surfaces of the supporting member and of at least one of the brake pads are disposed at an acute angle to the disk braking surface in the direction of rotation thereof for providing a self-energizing action upon said one brake pad.

3. A disk brake assembly as set forth in claim 1 wherein the cooperating inclined surfaces of the brake pads and of the supporting member converge in a direction away from the braking surface of the associated brake disk.

4. A disk brake assembly as set forth in claim 1 wherein the brake pads are spaced from each other in the direction of rotation of the disk and adapted to engage the same braking surface of the associated brake disk.

5. A disk brake assembly as set forth in claim 4 further including means for automatically adjusting the at-rest position of the actuating member for compensating for wear of the brake pads.

6. A disk brake assembly as set forth in claim 4 wherein the braking surface of the associated disk comprises an annular surface on one side of the disk, the disk further having a second annular braking surface upon its other side, said brake assembly further including a third brake pad juxtaposed to the second braking surface of the disk, the actuating member being effective to move said third brake pad into engagement with the second disk braking surface upon movement of said actuating member.

7. A disk brake assembly as set forth in claim 6 wherein the supporting member comprises a caliper supported for pivotal movement relative to the brake disk.

8. A disk brake assembly as set forth in claim 4 wherein the cooperating inclined surfaces of the brake pads and the supporting member converge in a direction away from the disk braking surface for effecting a self-energizing force upon one of the brake pads dependent upon the direction of rotation of the disk.

9. A disk brake assembly as set forth in claim 8 wherein the wedge shaped actuating member is interposed between the brake pads, and further including a lever pivotally connected at one of its ends to said actuating member and means for moving said lever for sliding said actuating member.

* * * * *